No. 866,748. PATENTED SEPT. 24, 1907.
H. C. THOMSON.
BATTERY ZINC.
APPLICATION FILED DEC. 21, 1903.
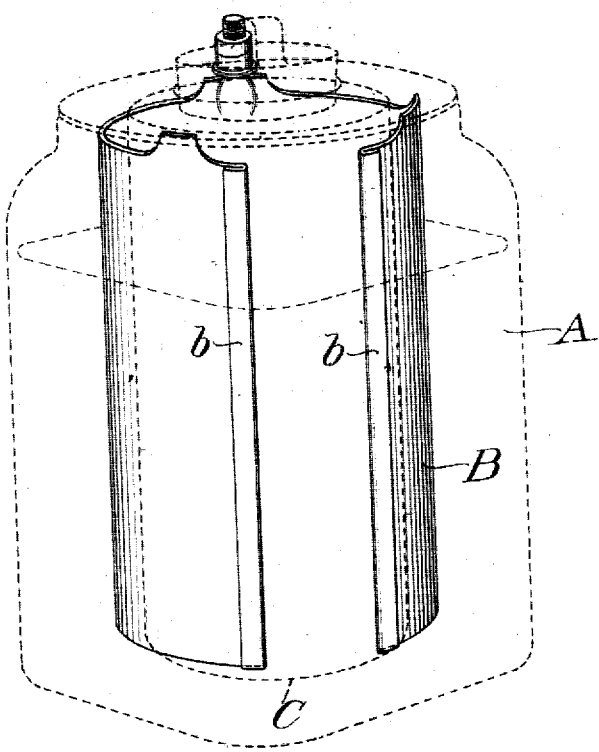
WITNESSES:
Fred C. Chamberlin
Michael Lucey
INVENTOR:
Henry C. Thomson

UNITED STATES PATENT OFFICE

HENRY C. THOMSON, OF BOSTON, MASSACHUSETTS, ASSIGNOR TO ELECTRIC GAS LIGHTING COMPANY, OF BOSTON, MASSACHUSETTS.

BATTERY-ZINC.

No. 866,748.                Specification of Letters Patent.                Patented Sept. 24, 1907.

Application filed December 21, 1903. Serial No. 185,973.

*To all whom it may concern:*

Be it known that I, HENRY C. THOMSON, a citizen of the United States, residing at Boston, Massachusetts, have invented a new and useful Improvement in Battery-Zincs, a specification of which is as follows.

My invention relates to preserving the life of battery zincs and thereby saving at least half their value which as at present used is wasted.

My invention consists in providing means for so extending the usefulness of said zincs.

My invention will be clearly understood from the drawing in which A is the ordinary exterior glass jar in which is contained the electrolyte and the circular zinc B with open edges within which is placed the carbon element C, the whole combination being provided with various necessary elements such as conducting wires, binding screws, a cover for the jar, etc., all of which may be of any desired variety and are immaterial to my invention.

I will now describe my invention. The action in presence of the liquid surrounding the battery zinc B is, of course, gradually to consume that element, and inasmuch as greater oxidation of the zinc takes place at the water-line, the effect is to eat away the zinc at that point and eventually cut the zinc in two. Sometimes this oxidation occurs more rapidly in one cell of a set of batteries than in another, the result being that the breaking in two of the zinc in one cell will open the circuit of the system in which the cells are being used. Sometimes only partial severance of the zinc will occur, thereby allowing a part of the zinc to fall against the carbon, which results in an internal short-circuit, rapidly depleting the strength of the cell. As the zinc above and below the point where it is thus eaten away is not materially reduced in weight, and would suffice for operation of the cell for a long time, this severing of the zinc is very expensive because it so greatly shortens and reduces the life of the battery. Various devices have been adopted for overcoming this inconvenience and saving this loss, but none of them, so far as I know, have been successful. I have remedied this difficulty by forming the zinc B with the turned-over lips $b, b$, thus doubling the amount of zinc at either or each of the edges of the circular zinc. It is immaterial whether the lip $b$ is brought into or left slightly, say less than $\frac{1}{16}$ of an inch, out of actual contact with the zinc. By this simple device, the life of the zinc is doubled, inasmuch as it will take twice as long to eat through both the lip and the zinc shell as it will to eat through the zinc shell itself.

Having described my invention, what I claim is—

A circular battery zinc provided at its open edges with a lip or lips $b$ turned back toward and either touching or almost touching upon the zinc B, substantially as and for the purpose described.

In witness whereof, I have hereunto set my hand this 18th day of December, 1903.

HENRY C. THOMSON.

In presence of—
FRED C. CHAMBERLIN,
MICHAEL LUCEY.